United States Patent [19]
Bonner et al.

[11] Patent Number: 5,637,410
[45] Date of Patent: Jun. 10, 1997

[54] ADHESIVE BLENDS

[75] Inventors: James G. Bonner, Edinburgh, Scotland; Philip K. G. Hodgson, Surrey, United Kingdom

[73] Assignee: BP Chemicals Limited, London, England

[21] Appl. No.: 436,379

[22] PCT Filed: Sep. 28, 1994

[86] PCT No.: PCT/GB94/02114

§ 371 Date: Jun. 14, 1995

§ 102(e) Date: Jun. 14, 1995

[87] PCT Pub. No.: WO95/09212

PCT Pub. Date: Apr. 6, 1995

[30] Foreign Application Priority Data

Sep. 28, 1993 [GB] United Kingdom ............ 9319973

[51] Int. Cl.$^6$ .............. B32B 27/08; C08F 8/32; C08L 51/00
[52] U.S. Cl. .............. 428/516; 428/36.91; 428/524; 525/66; 525/74; 525/77; 525/382
[58] Field of Search .............. 525/66, 74, 77, 525/382; 428/516, 36.91

[56] References Cited

U.S. PATENT DOCUMENTS

| | | | |
|---|---|---|---|
| 4,950,541 | 8/1990 | Tabor et al. | 525/74 |
| 4,983,435 | 1/1991 | Ueki et al. | 428/516 |
| 5,045,401 | 9/1991 | Tabor et al. | 525/74 |
| 5,064,724 | 11/1991 | Ofstein | 428/516 |
| 5,202,192 | 4/1993 | Hope et al. | 428/516 |
| 5,278,214 | 1/1994 | Moriya et al. | 525/66 |
| 5,373,065 | 12/1994 | Kitazawa et al. | 525/382 |
| 5,444,125 | 8/1995 | Tomita et al. | 525/382 |

FOREIGN PATENT DOCUMENTS

| | | |
|---|---|---|
| 0398734 | 11/1990 | European Pat. Off. |
| 0507557 | 10/1992 | European Pat. Off. |
| 63-141675 | 6/1988 | Japan. |

*Primary Examiner*—Tae Yoon
*Attorney, Agent, or Firm*—Fay, Sharpe, Beall, Fagan, Minnich & McKee

[57] ABSTRACT

A polyolefin-containing adhesive blend comprising: (A) 1 to 30 parts by weight of a graft copolymer having a polyolefin backbone grafted with 0.001 to 30% by weight of at least one polymerisable ethylenically unsaturated carboxylic acid or derivative thereof, (B) 70 to 99 parts by weight of a polyolefin provided that at least 5 parts by weight of (B) is (C) a polyethylene having a density of less than 930 kgm$^{-3}$ wherein the graft copolymer (A) has been reacted with a compound(D) which has at least two primary or secondary amino groups at least one of which is a primary amino group, the sum of (A), (B) and (C) being 100 parts by weight. Multilayer structures comprising a polyolefin layer, a polyketone layer and an intermediate layer of the adhesive blend are also disclosed.

25 Claims, No Drawings

ADHESIVE BLENDS

The present invention relates to polyolefin-containing adhesive blends and multi-layered structures comprising the adhesive blends, in particular multi-layered structures comprising at least one layer of a polyketone composition.

For the purposes of this patent, polyketones are defined as linear polymers having an alternating structure of (a) units derived from carbon monoxide and (b) units derived from one or more olefinically unsaturated compounds. Although for the purposes of this patent polyketones correspond to this idealised structure, it is envisaged that materials corresponding to this structure in the main but containing small regimes (i.e. up to 10 wt %) of the corresponding homopolymer or copolymer derived from the olefinically unsaturated compound, also fall within the definition.

Such polyketones have the formula:

where the R groups are independently hydrogen or hydrocarbyl groups, and m is a large integer; they are disclosed in several patents e.g. U.S. Pat. No. 3,694,412. Processes for preparing the polyketones are disclosed in U.S. Pat. No. 3,694,412 and also in EP 181014 and EP 121965.

Polyolefin-containing blends suitable for use as adhesive layers in multi-layered structures are known. These adhesives blends are commonly referred to as tie-layers. For example, U.S. Pat. No. 2,081,723 discloses a modified polyolefin adhesive blend comprising (A) a graft copolymer of a polyethylene back-bone grafted with at least one polymerisable ethylenically unsaturated carboxylic acid or carboxylic acid anhydride and (B) a blending resin mixture comprising a linear low density polyethylene and polypropylene. The patent states that the adhesive blends can be used to join polypropylene to a number of polar materials or to join two polar materials together.

The present invention provides a polyolefin-containing adhesive blend and in particular it provides an adhesive blend suitable for bonding polyolefins in particular polyethylene or polypropylene to polyketones which blend has good adhesion to polyolefins while maintaining good adhesion to the polyketone.

Thus, according to the present invention there is provided a polyolefin-containing adhesive blend comprising;

(A) 1 to 30 parts by weight of a graft copolymer having a polyolefin backbone grafted with 0.001 to 30% by weight of at least one polymerisable ethylenically unsaturated carboxylic acid or derivative thereof (B) 70 to 99 parts by weight of a polyolefin provided that at least 5 parts by weight of (B) is (C) a polyethylene having a density of less than 930 kgm$^{-3}$ wherein the graft copolymer (A) has been reacted with a compound (D) which has at least two primary or secondary amino groups at least one of which is a primary amino group, the sum of (A), (B) and (C) being 100 parts by weight.

The polyolefin used as the backbone of the graft copolymer can be a homopolymer of an olefin e.g. ethylene or propylene, in particular high density polyethylene (HDPE), low density polyethylene (LDPE), linear low density polyethylene (LLDPE) or very low density polyethylene (VLDPE), preferably LLDPE, or a copolymer of an olefin e.g. propylene with ethylene, butene or other unsaturated aliphatic hydrocarbons. Such homopolymers and copolymers are known and any such polymer can be used. Blends of two or more polyolefins can be used. It is preferred that the backbone of (A) is polypropylene or polyethylene; where the polyolefin backbone is a copolymer it is preferred that it comprises at least 80% of polymerised ethylene or 80% of polymerised propylene units. Where the adhesive blend of the present invention is used to bond a polyolefin to a polyketone, it is preferred that the polyolefin used in the backbone of (A) is the same as the polyolefin to be bonded. For example when polypropylene is to be bonded to polyketone by means of an adhesive blend of the present invention, component (A) is a graft copolymer of polypropylene.

Polymerisable ethylenically unsaturated carboxylic acids and derivatives thereof include, for example, acrylic acid, methacrylic acid, maleic acid, itaconic acid, citraconic acid, mesaconic acid, maleic anhydride, 4-methyl cyclohex-4-ene-1,2-dicarboxylic acid anhydride, bicyclo (2.2.2) oct-5-ene-2,3-dicarboxylic acid anhydride, 1,2,3,4,5,8,9,10-octahydronaphthalene- 2,3 dicarboxylic acid anhydride, 2-oxa-1,3-diketospiro (4.4) non-7-ene, bicyclo (2.2.1) hept-5-ene-2, 3-dicarboxylic acid anhydride, maleopimaric acid, tetrahydrophthalic anhydride, x-methyl-bicyclo (2.2.1) hept-5-ene-2,3-dicarboxylic acid anhydride, x-methyl-norborn-5-ene-2, dicarboxylic acid anhydride, norborn-5-ene- 2, 3-dicarboxylic acid anhydride. Preferably, maleic anhydride is used. When maleic anhydride is used as the polymerisable ethylenically unsaturated carboxylic acid anhydride, the amount which is graft copolymerised with the polypropylene backbone is typically from 0.001 to 30%, preferably from 0.1 to 10% more preferably from 0.15 to 5% by weight of the grafted copolymer.

Co-grafting monomers such as, for example, those described in U.S. Pat. No. 3,882,194 may also be used for preparing the graft copolymers of the present invention.

Methods for preparing graft copolymers are well known and any suitable method can be used to prepare the graft copolymer of the polyolefin e.g. polypropylene and polymerisable ethylenically unsaturated carboxylic acid or derivative thereof. One such suitable method comprises blending together the polyolefin and the polymerisable ethylenically unsaturated carboxylic acid or derivative thereof in the presence of a free radical initiator, such as an organic peroxide or hydroperoxide, at a temperature which is above the melting point of the polyolefin and which provides a suitable half-life of the free radical initiator. Suitable free radical initiators are well known. This grafting process can be carried out using known mixing equipment such as, for example, a Brabender mixer, a Banbury mixer or a roll mill. Preferably, the grafting process is carried out in a closed vessel. A convenient method of preparing the graft copolymer is therefore to extrude the polyolefin which forms the polymer backbone, the polymerisable ethylenically unsaturated carboxylic acid or derivative thereof and an organic peroxide or hydroperoxide through a single or multiple screw extruder.

The graft copolymer is further reacted with compound (D) which has at least two primary or secondary amino groups at least one of which is a primary amino group, to give (A). It is preferred that compound (D) is a diamine having two primary amino groups and up to 16 carbon atoms inclusive and at least two carbon atoms between the primary amino groups. The diamines suitably contain aromatic moieties linking the amino groups as illustrated by phenylenediamine, 4,4'-diaminobiphenyl and di(4-aminophenyl) ether, or the diamines contain cycloaliphatic linking moieties such as in the case of di(4-aminocyclohexyl)methane or 1,4-diaminocyclooctane. The preferred diamines, however, are the acyclic terminal primary diamines of the formula:

$$H_2N(CH_2)_nNH_2 \qquad (II)$$

wherein n is an integer from 2 to 16 inclusive. Such polymethylenediamines include trimethylenediamine, tetramethylenediamine, hexamethylenediamine, decamethylenediamine, dodecamethylenediamine and hexadecamethylenediamine. Of these diamines dodecamethylenediamine is preferred.

Compound (D) can also suitably be a polyalkylene polyamine, or a mixture thereof, having the formula:

$$H_2N(R-NH)_nH \qquad (III)$$

wherein R is a divalent aliphatic hydrocarbon group having 2 to 4 carbon atoms and n is an integer in the range from 1 to 10. More preferably the amine is a polyalkylene polyamine of the formula (III) wherein R is the group —$CH_2CH_2$— and n has a value of 2 to 6, i.e. a polyethylene polyamine. Examples of suitable polyethylene polyamines include triethylene tetramine and tetraethylene pentamine. Hydroxyalkyl amines, for example ethanolamine, diethanolamine, 2-hydroxypropylamine and N-hydroxyethyl ethylenediamines, and the like may also be used as compound (D).

Furthermore, compound (D) can be a compound of formula (IV), $$H_2N(CHR^1CHR^2O)_nCHR^3CHR^4NH_2 \qquad (IV)$$

wherein one of $R^1$ and $R^2$ is hydrogen and the other is hydrogen or lower alkyl, preferably $C_2$–$C_6$ alkyl, more preferably methyl, and n is an integer from 1 to 40 preferably from 1 to 10 more preferably 1 to 7, for example 2 to 7, one of $R^3$ and $R^4$ is hydrogen and the other is hydrogen or lower alkyl, preferably $C_2$–$C_6$ alkyl, more preferably methyl.

In particular where compound (D) is of formula (IV) it is preferred that compounds of formula, $$NH_2CH(CH_3)CH_2[OCH_2CH(CH_3)]_xNH_2$$

where x=33.1, 5.6 and 2.6 are used. These compounds are commercially available and are marketed under the trade names Jeffamine D2,000, D400 and D230 respectively.

Compound (D) can be reacted with the graft copolymer in several ways; a preferred method however is to react them in the melt by melt mixing them in known mixing equipment e.g. a Brabender mixer, a Banbury mixer or a roll mill or twin-screw extruder. It is possible to melt mix the diamine with the graft copolymer in the grafting process itself preferably in 2 steps. The reaction of compound (D) with the graft copolymer can be carried out either before or at the same time as mixing with (B), with or without (C). However, it is preferred that the graft copolymer is first reacted with compound (D) and then mixed with (B) which will include (C); where (B) comprises (C) and another component, the other component and (C) can be added separately or simultaneously preferably simultaneously.

The blends of (A) the modified graft polyolefin and (B) the polyolefin which comprises a proportion of (C) can be prepared using known techniques and equipment for batch or continuous blending.

The adhesive blends according to the present invention may also contain additives conventionally used in such compositions such as, for example, antioxidants.

The polyolefin-containing adhesive blends according to the present invention are particularly suitable for bonding polyolefins to polyketones. Methods for using adhesive compositions to bond polyolefins to polar substrates are known and include lamination, coextrusion, extrusion lamination and coextrusion coating.

The present invention includes multi-layered structures comprising a first layer comprising a polyolefin composition and a second layer comprising a polyketone composition, the first and second layers being bonded together with an intermediate layer of a polyolefin-containing adhesive blend according to the present invention. In particular, the present invention relates to such multi-layered structures when prepared by co-extrusion e.g. multi-layered film produced by co-extrusion. The polyolefin layer can be any layer comprising a major proportion of an olefin homopolymer or copolymer. Preferably, the polyolefin layer comprises polyethylene or polypropylene e.g. at least 70% by weight of polymerised propylene units. The second layer comprises a polyketone composition as noted above. As noted above for the purposes of this patent, polyketones are defined as linear polymers having an alternative structure of (a) units derived from carbon monoxide and (b) units derived from one or more olefinically unsaturated compounds. Suitable olefinic units are those derived from $C_2$ to $C_{12}$ alpha-olefins or substituted derivatives thereof or styrene or alkyl substituted derivatives of styrene. It is preferred that such olefin or olefins are selected from $C_2$ to $C_6$ normal alpha-olefins and it is particularly preferred that the olefin units are either derived from ethylene or most preferred of all from a mixture of ethylene and one or more $C_3$ to $C_6$ normal alpha-olefin(s) especially propylene. In these most preferable materials it is further preferred that the molar ratio of ethylene units to $C_3$ to $C_6$ normal alpha-olefin units is greater than or equal to 1 most preferably between 2 and 30.

Component (B) is 70 to 99 parts by weight of polyolefin provided that at least 5 of those 70 to 99 parts by weight is (C) a polyethylene having a density of less than 930 $kgm^{-3}$. While it is possible that component (B) consists entirely of (C), a polyethylene having a density of less than 930 $kgm^{-3}$, it is preferred that component (B) comprises at least two components, Component (C) and a second component which is not a polyethylene having a density less than 930 $kgm^{-3}$. Such a second component can be any suitable polyolefins e.g. polyethylene, polypropylene, copolymers of ethylene or copolymers of propylene with one or more comonomers e.g. butene. This second component of (B) will preferably be the same as the polyolefin used to prepare (A) i.e. where (A) is a modified grafted copolymer of polypropylene, the second component of (B) will preferably be polypropylene. Furthermore where the adhesive blends of the present invention are used to bond a polyolefin composition to a polyketone composition, it is preferred that the second component of (B) will be the same or a similar polyolefin to that found in the polyolefin composition to be bonded.

(C) is a polyethylene having a density less than 930 $kgm^{-3}$ for example very low density polyethylene (VLDPE), (also known as ultra low density polyethylene) linear low density polyethylene (LLDPE) or ethylene propylene rubbers. It is preferred that (C) has a density less than 925, more preferably less than 915 $kgm^{-3}$; it is preferred that component (C) is VLDPE. Such polymers are known and are copolymers of ethylene with one or more alpha-olefins preferably at least 2 alpha olefins. Suitable alpha-olefins include those having from 3 to 10 carbon atoms such as propylene, butene-1, hexene-1, 4-methylpentene-1 and octene-1. It is preferred that VLDPE contains at least one alpha olefin of 4 to 10 carbons e.g. butene or octene optionally with propylene. VLDPEs have a higher total comonomer content and lower density compared to linear low density polyethylene (LLDPE) but have a substantially linear structure with short chain branches. Typically, the total comonomer content of a VLDPE is from 5 to 25%, preferably 12–20% by weight. Preferably the VLDPE is composed by weight of 4–15% of propylene and 4–15% of a higher olefin of at least 4 carbons such as butene though VLDPE with one comonomer e.g. of 6–10 carbons such as octene –1 can be used and especially in an amount of 10–25 by weight. The density of the VLDPE is suitably from 860 to 915, preferably 880 to 905 more preferably 885 to 900 kg/m$^3$. A mixture of two or more polyolefins having a density less than 930 kgm$^{-3}$ can be used in the adhesive compositions according to the present invention.

According to a preferred embodiment of the present invention a polyolefin-containing adhesive blend comprises;

(A) 5 to 30 parts by weight of a graft copolymer of a polyethylene or polypropylene backbone grafted with 0.001 to 30% by weight of at least one polymerisable ethylenically unsaturated carboxylic acid or derivative thereof (B) 5 to 50 parts by weight of very low density polyethylene and (C) 20 to 90 parts by weight of polyethylene or polypropylene, wherein the graft copolymer of (A) has been reacted with compound (D) as defined hereinabove, and the sum of (A), (B) and (C) being 100 parts by weight.

The multi-layered structures according to the present invention can include further layers in addition to the three layers hereinbefore defined. For example, a five-layered structure can comprise a first layer of a polyolefin composition, a second layer of an adhesive composition according to the present invention, a third layer of a polyketone composition, a fourth layer of an adhesive composition according to the present invention and a fifth layer of a polyolefin composition.

It has been found that the use of polyolefin-containing adhesive blends of the present invention to produce multi-layered film provides a satisfactory bond when the film is subsequently thermoformed, i.e. the film does not have a tendency to delaminate after thermoforming, e.g. into containers. The present invention includes articles produced by thermoforming a multi-layered film or sheet comprising a first layer comprising a polyolefin composition and a second layer comprising a polyketone composition, the first layer and the second layer being bonded together by an intermediate layer of a polyolefin-containing adhesive blend according to the present invention.

The invention is illustrated by the following examples:

EXAMPLE 1

Dodecamethylenediamine (1.26 g) was melt mixed with maleic anhydride grafted polypropylene (~1.5% wt MAH) (42 g) in a Brabender Plasticorder for 10 minutes at 200° C. under nitrogen with a rotor speed of 60 rpm. The product was then melt-blended with polypropylene and VLDPE in the weight ratio of 10:60:30 graft PP:PP:VLDPE respectively. This material was compression moulded between two 125 micron layers of EPCO at 260° C. under 10 tons of load. The subsequent layer materials could not be separated. In a peel test using an Instron 122 with cross-head speed of 100 mm/min and a 1–50 kg load cell cohesive failure of the layer comprising modified graft PP/VLDPE/PP (tie layer) occurred. The bond at the tie-layer/EPCO interface remained intact.

Details of materials used are as follows:

| Material | Supplier | Grade | Description | MFR (g/10 min) |
|---|---|---|---|---|
| PP | Hüls | Vestolen P8400 | EP Random copolymer | 1.5 (see (a)) |
| VLDPE | Enichem | Clearflex FFDO | Ethylene copolymer | 0.8 (see (b)) |
| MAH-g-PP | BPCL | Polybond 3000 | Maleic anhydride grafted PP | 350–430 (see (a)) |
| EPCO | BPCL | — | Olefin/CO alternating copolymer (MP 205° C.) | 20 (see (c)) |

(a) MFR conditions: 2.16 kgs load @ 230° C.
(b) MFR conditions: 2.16 kgs load @ 190° C.
(c) MFR conditions: 5 kgs load @ 240° C.

EXAMPLE 2

1.5%wt dodecamethylenediamine was premixed with maleic anhydride grafted polypropylene (~1.5%wt MAH) then melt processed in an APV 15 mm co-rotating twin screw extruder. The extruder was run with a set temperature of 220° C. on both the barrel and die and at a screw speed of 150 rpm. The product was then melt blended with polypropylene and VLDPE in the weight ratio of 10:60:30, graft PP:PP:VLDPE respectively. This melt blending was carried out using a Werner & Pfleiderer ZSK 30 co-rotating twin screw extruder using a screw speed of 100 rpm and the following temperature profile: zone 1, 180° C.; zone 2, 200° C.; zone 3, 200° C.; zone 4, 200° C. and zone 5, 200° C. The materials were devolatilised through a vacuum vent in the extruder barrel. This tie layer material was coextruded into a 5 layer sheet made up as follows: PP/TL/EPCO/TL/PP. The coextrusion system consisted of three extruders, feedlock, a coathanger die and a haul off/cooling unit. A Hartig 1.5" single screw extruder was used for the PP layers; a Killion 1" single screw extruder was used to feed the tie layer; and a Killion 1" single screw extruder was used to feed the EPCO layer.

The individual layers in the sheet produced could not be separated; the bond at the tie layer/PP and tie layer/EPCO interfaces remained in tact.

The sheet produced was thermoformed using a Sencorp Systems thermoforming unit under the following conditions:

| Variable | Set Conditions |
|---|---|
| Pre-heat Platens Temperature (°F.) | 600 (315° C.) |
| Plug Assist Temperature (°F.) | 200 (93° C.) |
| Mould Temperature | Water Cooled (approx. 20° C.) |
| Pre-heat Time (secs) | 104 |
| Vacuum Applied (mm of Hg) | 680 |
| Forming Time (secs) | 6 (only 4 with vacuum applied) |

The subsequent containers showed no sign of delamination and indeed when examined the bond at the tie layer/PP and tie layer/EPCO interfaces again remained intact. Details of the PP, VLDPE, MAH-g-PP and EPCO are as shown in Example 1.

EXAMPLE 3

This is identical to Example 2 except that the graft PP was prepared with 3%wt dodecamethylenediamine.

EXAMPLE 4

This is identical to Example 2 except that the graft PP was prepared with 1.5%wt Jeffamine D230.

EXAMPLE 5

0.75%wt dodecamethylenediamine was premixed with maleic anhydride grafted HDPE (~1%wt. MAH) then melt processed in an APV 15 mm co-rotating twin screw extruder, run with a set temperature of 220° C. on both barrel and die and at a screw speed of 150 rpm.

The product was then melt blended with low density polyethylene (LDPE) and VLDPE in the weight ratio of 12:58:30, graft HDPE:LDPE:VLDPE respectively. The melt blending was done using a Werner & Pfleiderer ZSK 30 co-rotating twin screw extruder; with a screw speed of 100 rpm and the following temperature profile: zone 1, 180° C.; zone 2, 200° C.; zone 3, 200° C.; zone 4, 200° C.; zone 5, 200° C. A 125 microns layer of this material was compression moulded between two 125 microns layers of EPCO at 260° C. under 10 tonnes of load. The subsequent layer materials could not be separated; the bond at the tie layer/EPCO interface remained intact and only cohesive failure of the tie layer occurred.

Details of the materials used are as follows:

| Material | Supplier | Grade | Description | MFR (g/10 mins) |
| --- | --- | --- | --- | --- |
| LDPE | BPCL | Novex 23L430 | Ethylene Homo-polymer | 4 (see (a)) |
| VLDPE | Enichem | Clearflex FFDO | Ethylene copolymer | 0.8 (see (a)) |
| MAH-g-HDPE | BPCL | Polybond 3009 | Maleic Anhydride grafted HDPE | 34 (see (b)) |
| EPCO | BPCL | — | Olefin/CO alternating copolymer (MP 205° C.) | 20 (see (b)) |

(a) MFR conditions: 2.16 kgs load @ 190° C.
(b) MFR conditions: 5 kgs load @ 240° C.

EXAMPLE 6

This is identical to Example 5 except that the graft HDPE was prepared using 1%wt. dodecamethylenediamine.

EXAMPLE 7

This is identical to Example 5 except that a different VLDPE grade was used in the tie layer formulation: Clearflex MQFO (MFR=13 g/10 mins with 2.16 kg load @ 190° C.).

We claim:

1. A polyolefin-containing adhesive blend comprising;
   (A) 1 to 30 parts by weight of a graft copolymer having a polyolefin backbone grafted with 0.001 to 30% by weight of at least one polymerisable ethylenically unsaturated carboxylic acid or anhydride derivative thereof
   (B) 70 to 99 parts by weight of a polyolefin provided that at least 5 parts by weight of (B) is
   (C) a polyethylene having a density of less than 930 kgm$^{-3}$
wherein the graft copolymer (A) has been reacted with a compound (D) which has at least two primary or secondary amino groups at least one of which is a primary amino group, the sum of (A), (B) and (C) being 100 parts by weight.

2. A polyolefin-containing adhesive blend as claimed in claim 1 wherein the polyolefin backbone of the graft copolymer is derived from polyethylene.

3. A polyolefin-containing adhesive blend as claimed in claim 1 wherein the polyolefin backbone of the graft copolymer is derived from polypropylene.

4. A polyolefin-containing adhesive blend as claimed in claim 1 wherein the polymerisable ethylenically unsaturated carboxylic acid anhydride is maleic anhydride.

5. A polyolefin-containing adhesive blend as claimed in claim 1 wherein (C) is a very low density polyethylene.

6. A polyolefin-containing adhesive blend as claimed in claim 5 wherein the very low density polyethylene has a density in the range 860–915 kgm$^{-3}$.

7. A polyolefin-containing adhesive blend as claimed in claim 1 wherein (B) comprises a polyolefin which is the same as the polyolefin from which the polyolefin backbone in (A) is derived.

8. A polyolefin-containing adhesive blend as claimed in claim 1 wherein compound (D) is a compound of the formula $$H_2N(CH_2)_nNH_2$$

where n is in the range 1 to 40.

9. A polyolefin-containing adhesive blend as claimed in claim 1 wherein compound (D) is a compound of the formula $$NH_2CH(CH_3)CH_2[OCH_2CH(CH_3)]_xNH_2$$

where x is in the range 1 to 40.

10. A multi-layer structure comprising a first layer comprising a polyolefin composition and a second layer comprising a polyketone composition, the first and second layers being bonded together with an intermediate layer of a polyolefin-containing adhesive blend as claimed in claim 1.

11. A polyolefin-containing adhesive blend as claimed in claim 2 wherein the polymerisable ethylenically unsaturated carboxylic acid anhydride is maleic anhydride.

12. A polyolefin-containing adhesive blend as claimed in claim 3 wherein the polymerisable ethylenically unsaturated carboxylic acid anhydride is maleic anhydride.

13. A polyolefin-containing adhesive blend as claimed in claim 2 wherein (C) is a very low density polyethylene.

14. A polyolefin-containing adhesive blend as claimed in claim 3 wherein (C) is a very low density polyethylene.

15. A polyolefin-containing adhesive blend as claimed in claim 4 wherein (C) is a very low density polyethylene.

16. A polyolefin-containing adhesive blend as claimed in claim 4 wherein (B) comprises a polyolefin which is the same as the polyolefin from which the polyolefin backbone in (A) is derived.

17. A polyolefin-containing adhesive blend as claimed in claim 5 wherein (B) comprises a polyolefin which is the same as the polyolefin from which the polyolefin backbone in (A) is derived.

18. A polyolefin-containing adhesive blend as claimed in claim 4 wherein compound (D) is a compound of the formula $$H_2N(CH_2)_nNH_2$$

where n is in the range 1 to 40.

19. A polyolefin-containing adhesive blend as claimed in claim 4 wherein compound (D) is a compound of the formula $NH_2CH(CH_3)CH_2[OCH_2CH(CH_3)]_xNH_2$ where x is in the range 1 to 40.

20. A multi-layer structure comprising a first layer comprising a polyolefin composition and a second layer comprising a polyketone composition, the first and second layers being bonded together with an intermediate layer of a polyolefin-containing adhesive blend as claimed in claim 4.

21. A multi-layer structure comprising a first layer comprising a polyolefin composition and a second layer comprising a polyketone composition, the first and second layers being bonded together with an intermediate layer of a polyolefin-containing adhesive blend as claimed in claim 5.

22. A multi-layer structure comprising a first layer comprising a polyolefin composition and a second layer comprising a polyketone composition, the first and second layers being bonded together with an intermediate layer of a polyolefin-containing adhesive blend as claimed in claim 6.

23. A multi-layer structure comprising a first layer comprising a polyolefin composition and a second layer comprising a polyketone composition, the first and second layers being bonded together with an intermediate layer of a polyolefin-containing adhesive blend as claimed in claim 7.

24. A multi-layer structure comprising a first layer comprising a polyolefin composition and a second layer comprising a polyketone composition, the first and second layers being bonded together with an intermediate layer of a polyolefin-containing adhesive blend as claimed in claim 8.

25. A multi-layer structure comprising a first layer comprising a polyolefin composition and a second layer comprising a polyketone composition, the first and second layers being bonded together with an intermediate layer of a polyolefin-containing adhesive blend as claimed in claim 9.

* * * * *